US012608658B2

(12) United States Patent
Ghosh et al.

(10) Patent No.: US 12,608,658 B2
(45) Date of Patent: *Apr. 21, 2026

(54) DYNAMICALLY UPDATED ENSEMBLE-BASED MACHINE LEARNING FOR STREAMING DATA

(71) Applicant: Accenture Global Solutions Limited, Dublin (IE)

(72) Inventors: Sourav Ghosh, Kolkata (IN); Paritosh Pramanik, Bangalore (IN); Jyoti Singh, Hyderabad (IN); Theerthala Siva Rama Sarma, Secunderabad (IN); Nivetha Suruliraj, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 915 days.

This patent is subject to a terminal disclaimer.

(21) Appl. No.: 17/711,017

(22) Filed: Mar. 31, 2022

(65) Prior Publication Data

US 2023/0316153 A1 Oct. 5, 2023

(51) Int. Cl.
*G06N 20/20* (2019.01)
(52) U.S. Cl.
CPC .................................... *G06N 20/20* (2019.01)
(58) Field of Classification Search
CPC ...................................................... G06N 20/20
USPC ........................................................ 706/12
See application file for complete search history.

(56) References Cited

U.S. PATENT DOCUMENTS

| | | | |
|---|---|---|---|
| 12,412,382 B2 * | 9/2025 | Subhash Dhok ...... | G06V 10/82 |
| 2008/0071721 A1 | 3/2008 | Wang et al. | |
| 2008/0126556 A1 | 5/2008 | Perng et al. | |
| 2019/0122139 A1 * | 4/2019 | Perez ..................... | G06N 20/00 |
| 2020/0258223 A1 * | 8/2020 | Yip ......................... | G06F 18/21 |
| 2020/0302296 A1 * | 9/2020 | Miller .................... | G06N 20/20 |
| 2021/0011920 A1 * | 1/2021 | Sudarsan .............. | G06F 16/243 |

(Continued)

OTHER PUBLICATIONS

Over a Decade of Social Opinion Mining: A Systematic Review; Cortis et al.; Artificial Intelligence Review, Jan. 1, 2021; https://doi.org/10.1007/s10462-021-10031-2.*

(Continued)

*Primary Examiner* — Ruay Ho
(74) *Attorney, Agent, or Firm* — Seed Intellectual Property Law Group LLP

(57) ABSTRACT

Aspects of the present disclosure provide systems, methods, and computer-readable storage media that support dynamically updated ensemble-based machine learning (ML) classification. An ensemble of ML classifiers may be created from a plurality of trained ML classifiers. These initial ML classifiers may be trained using labeled data to generate predictions based on input data. When an unlabeled data stream is received, the unlabeled data stream may be provided as input to the ensemble to generate predictions. After obtaining labels for the received data, the labels and the unlabeled data stream may be used to train new ML classifiers. The new ML classifiers may replace older ML classifiers in the ensemble. In this manner, the ensemble of ML classifiers is used to perform predictions on high volume streaming data while being dynamically updated with ML classifiers that have learned changes in statistical distribution across more recent input data.

19 Claims, 5 Drawing Sheets

(56)                References Cited

U.S. PATENT DOCUMENTS

| | | | | |
|---|---|---|---|---|
| 2021/0056404 | A1* | 2/2021 | Goswami | G06F 18/22 |
| 2021/0073686 | A1* | 3/2021 | Ding | G06N 20/20 |
| 2021/0350277 | A1* | 11/2021 | Agrawal | G06N 5/046 |
| 2022/0050061 | A1* | 2/2022 | Bar | G03F 7/706841 |

OTHER PUBLICATIONS

Co-op Training: A Semi-supervised Learning Method for Data Streams; Monteiro et al.; 2021 IEEE International Conference on Systems, Man, and Cybernetics (SMC) (2021, pp. 933-938).*

Brzezinski, D. et al. "Reacting to Different Types of Concept Drift: The Accuracy Updated Ensemble Algorithm," IEEE Transactions on Neural Networks and Learning Systems, vol. 25, No. 1, Jan. 2014, 14 pages.

European Patent Office, Communication, Extended European Search Report issued for European Patent Application No. 23156973.2, dated Jul. 19, 2023, 9 pages.

Chen, Z. et al., Lifelong Machine Learning, Chapter 4, Morgan & Claypool Publishers, 2018, pp. 55-75.

Tahir, G. A. et al., "Mitigating Catastrophic Forgetting in Adaptive Class Incremental Extreme Learning Machine Through Neuron Clustering," 2020 IEEE International Conference on Systems, Man, and Cybernetics (SMC), Toronto, ON, Canada, 2020, pp. 3903-3910, doi: 10.1109/SMC42975.2020.9283305.

He, Y. et al., "CLeaR: An adaptive continual learning framework for regression tasks," AI Perspectives, 2021, vol. 3, No. 2, 16 pages, https://doi.org/10.1186/s42467-021-00009-8.

Yang, Y. et al., "Adaptive Deep Models for Incremental Learning: Considering Capacity Scalability and Sustainability," KDD (Knowledge Discovery in Databases) 2019, Aug. 2019, Anchorage, Alaska, pp. 74-82, https://doi.org/10.1145/1122445.1122456.

Brownlee, J., "Dynamic Ensemble Selection (DES) for Classification in Python," Machine Learning Mastery, Ensemble Learning, Apr. 27, 2021, https://machinelearnigmastery.com/dynamic-ensemble-selection-in-python/.

Rathod, A., "How to Apply Continual Learning to Your Machine Learning Models," Jul. 11, 2019, 10 pages, https://www.darbaar.com/apply-continual-learning-to-machine-learning-models/.

* cited by examiner

208

Newly Trained ML Model(s) (when Label for Data Stream Arrives)

212

Archive of Older ML Models

202

Dynamically Updated Ensemble of ML Models

206

Data Stream(s) (Unlabeled)

204

Data Stream(s) (Labeled)

210

Prediction(s)

200

400

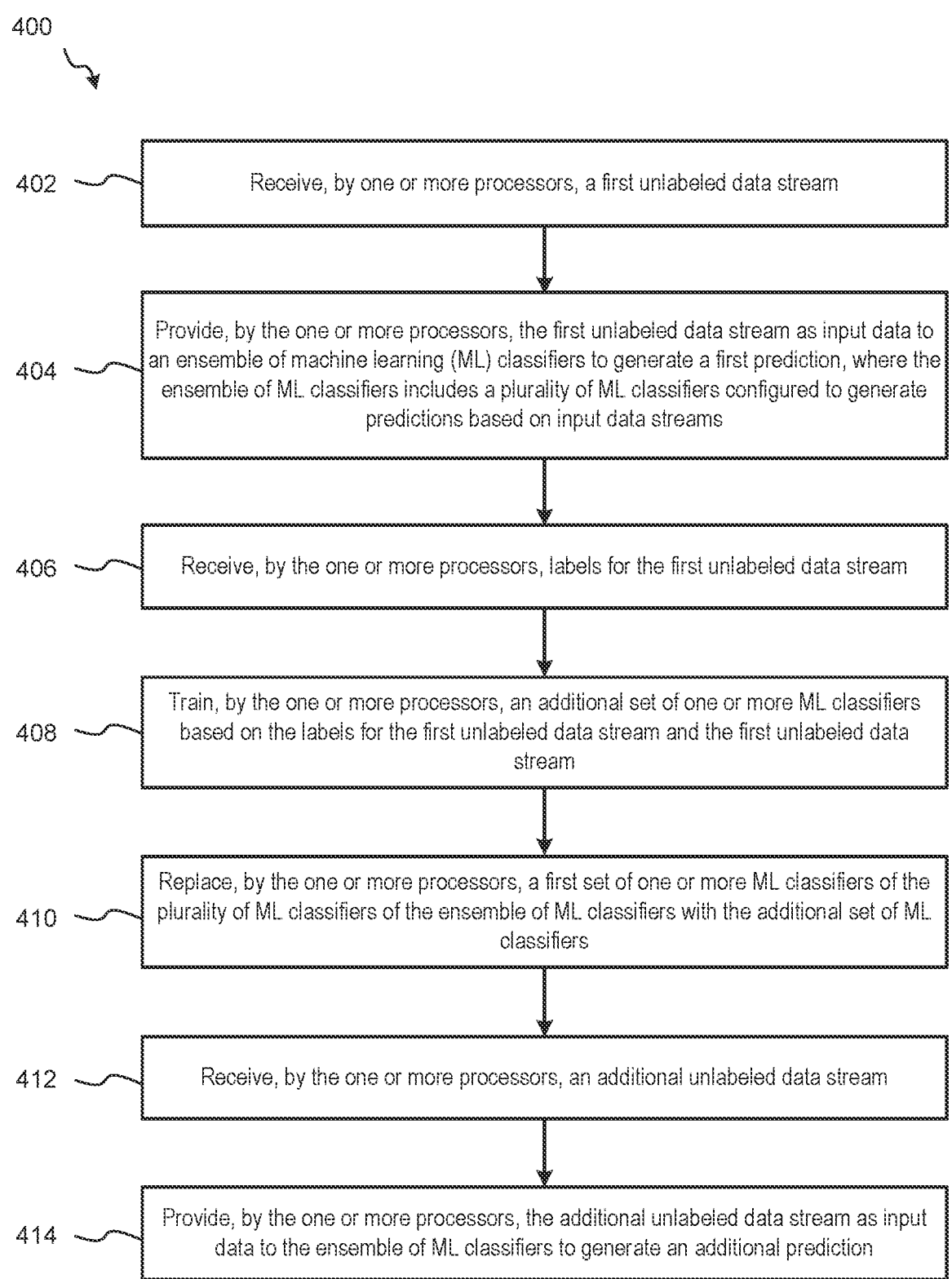

402 — Receive, by one or more processors, a first unlabeled data stream

404 — Provide, by the one or more processors, the first unlabeled data stream as input data to an ensemble of machine learning (ML) classifiers to generate a first prediction, where the ensemble of ML classifiers includes a plurality of ML classifiers configured to generate predictions based on input data streams 406 — Receive, by the one or more processors, labels for the first unlabeled data stream 408 — Train, by the one or more processors, an additional set of one or more ML classifiers based on the labels for the first unlabeled data stream and the first unlabeled data stream 410 — Replace, by the one or more processors, a first set of one or more ML classifiers of the plurality of ML classifiers of the ensemble of ML classifiers with the additional set of ML classifiers 412 — Receive, by the one or more processors, an additional unlabeled data stream 414 — Provide, by the one or more processors, the additional unlabeled data stream as input data to the ensemble of ML classifiers to generate an additional prediction

*FIG. 4*

DYNAMICALLY UPDATED ENSEMBLE-BASED MACHINE LEARNING FOR STREAMING DATA

TECHNICAL FIELD

The present disclosure relates generally to dynamically updating ensemble-based machine learning for processing streaming data. In particular implementations, the aspects described herein provide for dynamically adding and removing machine learning models from an ensemble of machine learning models as streaming data is received and labeled for use in training.

BACKGROUND

Machine learning (ML) and artificial intelligence (AI) technology have been leveraged to provide advanced data processing and analytics functions, image and facial recognition functions, and many other types of computer functionality. For example, ML models have been trained to predict network errors based on network measurement data or to predict whether an input image or video includes a user's face. Typically, ML and AI classifiers are trained on labeled (e.g., categorized) historic data to recognize underlying patterns or similarities in the various categories of the historic data, and once trained, the classifier outputs a prediction for what category (e.g., label) corresponds to an unlabeled input. Because training such classifiers can be time and resource intensive, ML classifiers are not typically able to be trained on real-time data.

The world has been witnessing relentless digital adoption with the proliferation of data generation in recent years from various sources such as the Internet, Internet of Things (IoT) sensors, emails, and the like. Conventionally, the data generated from these sources can be grouped as structured data, semi-structured data, and unstructured data, and the data may be stored in big data repositories within enterprise systems. Petabytes of such data is used for various business purposes using analytical tools aided by ML and AI algorithms and/or models. As business advances, the desire for real-time analytics with online incremental and/or continuous ML has assumed greater significance in some types of businesses. Conventional methods of retraining ML models based on static historical data typically are time intensive and are therefore only done periodically, not at real-time or near real-time speed.

However, in real-time or near real-time analytics, insights or decision may need to be obtained instantly based on an incoming data stream rather than static data stored in repositories. This is because, in such business scenarios, insights or decisions are based on incremental information and are perishable in the sense that latency between the incoming data and the decisions that are drawn based on this data may significantly reduce usefulness of the decisions. It is not surprising, therefore, that real-time analytics has gained considerable attention in recent years. Some applications of real-time analytics using streaming data include financial fraud detection, purchase recommendation, weather forecasting, network management, operations research, security surveillance, and algorithmic trade using stock market data.

Using streaming data as training data and input data for ML models presents a number of challenges. One challenge is that learned ML models from a preceding part (e.g., "window") of a high-volume data stream are used for prediction on the next part (e.g., "window") of the data stream. Additionally, the ML models need to acquire new learnings (e.g., be retrained) so that they do not become outdated while the statistical properties of the current data stream window may evolve or change over time, a behavior commonly known as "concept drift." However, retraining ML models based on newer windows of a data stream can be time consuming such that the learnings of the ML models typically lag behind changes in statistical properties of the data stream. Another problem is that the ML models should be dynamically (e.g., "on the fly") updated based on an incrementally changing (e.g., in statistical properties), continuous influx of streaming data without being retrained on historical data, which is the conventional method for retraining ML models. Another problem is that the retrained (e.g., updated) ML models should not interfere with previously learned knowledge by forgetting the previously learned knowledge from preceding data distributions, a phenomenon known as "catastrophic forgetting." Other problems include the inability to retrain ML models in a single pass of high volume data and/or without experience performance degradation to the ML models. What is needed are ML models that can be used on incrementally changing, large volumes of streaming data without experiencing performance degradation, particularly due to concept drift and catastrophic forgetting.

SUMMARY

Aspects of the present disclosure provide systems, methods, apparatus, and computer-readable storage media that support dynamically updated ensemble-based machine learning classification. Dynamically updating an ensemble of machine learning (ML) models, particularly ML classifiers, enables the ensemble to process streaming data (e.g., incrementally changing, large volumes of data) without experiencing problems of conventional ML models when dealing with large quantities of data, such as catastrophic forgetting and concept drift. To illustrate, a plurality of ML models may be ensembled (e.g., combined) to create an ensemble of ML models. In ML, ensembling is a technique in which multiple ML models may be configured to output a prediction, or perform another type of operation, based on input data, and the outputs of the multiple ML models may be combined to generate an overall output. In some implementations, the plurality of ML models includes multiple sets of ML models that each include one or more types of ML models, such as Hoeffding Tree Classifiers, Hoeffding Tree Adaptive Classifiers, and Extremely Fast Decision Tree Classifiers, as non-limiting examples. The plurality of ML models may be initially trained in sets using labeled data, similar to typical ML training using historic data. Once the ensemble of ML models is put into service, the ensemble may generate predictions (e.g., classifications) based on unlabeled data streams as they are received. To provide for dynamic updating capabilities, each unlabeled data stream may be separately processed or analyzed to generate corresponding labels, and a new set of ML models may be trained using an unlabeled data stream once the labels are obtained. The new set of ML models may replace an oldest set of ML models in the ensemble, such that the ensemble of ML models is continually updated with ML models trained based on newer data streams. This dynamic, continual updating enables the ensemble of ML models to adapt to changes in the data streams over time, thereby reducing or eliminating concept drift. Additionally, in some implementations, ML models that are replaced in the ensemble of ML models may be stored in an archive. ML models stored in the archive may be added back to the ensemble of ML models if accuracy metrics for the archived ML models exceeds accuracy metrics for the current ensemble. In this manner, previously learned patterns (e.g., "learnings") may be maintained and re-introduced when beneficial, thereby reducing or eliminating issues of catastrophic forgetting.

In a particular aspect, a method for dynamically updating an ensemble of ML classifiers includes receiving, by one or more processors, a first unlabeled data stream. The method also includes providing, by the one or more processors, the first unlabeled data stream as input data to an ensemble of ML classifiers to generate a first prediction. The ensemble of ML classifiers includes a plurality of ML classifiers configured to generate predictions based on input data streams. The method includes receiving, by the one or more processors, labels for the first unlabeled data stream. The method also includes training, by the one or more processors, an additional set of one or more ML classifiers based on the labels for the first unlabeled data stream and the first unlabeled data stream. The method includes replacing, by the one or more processors, a first set of one or more ML classifiers of the plurality of ML classifiers of the ensemble of ML classifiers with the additional set of ML classifiers. The method also includes receiving, by the one or more processors, an additional unlabeled data stream. The method further includes providing, by the one or more processors, the additional unlabeled data stream as input data to the ensemble of ML classifiers to generate an additional prediction.

In another particular aspect, a system for dynamically updating an ensemble of ML classifiers includes a memory and one or more processors communicatively coupled to the memory. The one or more processors are configured to receive a first unlabeled data stream. The one or more processors are also configured to provide the first unlabeled data stream as input data to an ensemble of ML classifiers to generate a first prediction. The ensemble of ML classifiers includes a plurality of ML classifiers configured to generate predictions based on input data streams. The one or more processors are configured to receive labels for the first unlabeled data stream. The one or more processors are also configured to train an additional set of one or more ML classifiers based on the labels for the first unlabeled data stream and the first unlabeled data stream. The one or more processors are configured to replace a first set of one or more ML classifiers of the plurality of ML classifiers of the ensemble of ML classifiers with the additional set of ML classifiers. The one or more processors are also configured to receive an additional unlabeled data stream. The one or more processors are further configured to provide the additional unlabeled data stream as input data to the ensemble of ML classifiers to generate an additional prediction.

In another particular aspect, a non-transitory computer-readable storage medium stores instructions that, when executed by one or more processors, cause the one or more processors to perform operations for dynamically updating an ensemble of ML classifiers. The operations include receiving a first unlabeled data stream. The operations also include providing the first unlabeled data stream as input data to an ensemble of ML classifiers to generate a first prediction. The ensemble of ML classifiers includes a plurality of ML classifiers configured to generate predictions based on input data streams. The operations include receiving labels for the first unlabeled data stream. The operations also include training an additional set of one or more ML classifiers based on the labels for the first unlabeled data stream and the first unlabeled data stream. The operations include replacing a first set of one or more ML classifiers of the plurality of ML classifiers of the ensemble of ML classifiers with the additional set of ML classifiers. The operations also include receiving an additional unlabeled data stream. The operations further include providing the additional unlabeled data stream as input data to the ensemble of ML classifiers to generate an additional prediction.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which:

FIG. 4 is a flow diagram illustrating an example of a method for dynamically updating an ensemble of ML classifiers according to one or more aspects.

Figure 1:
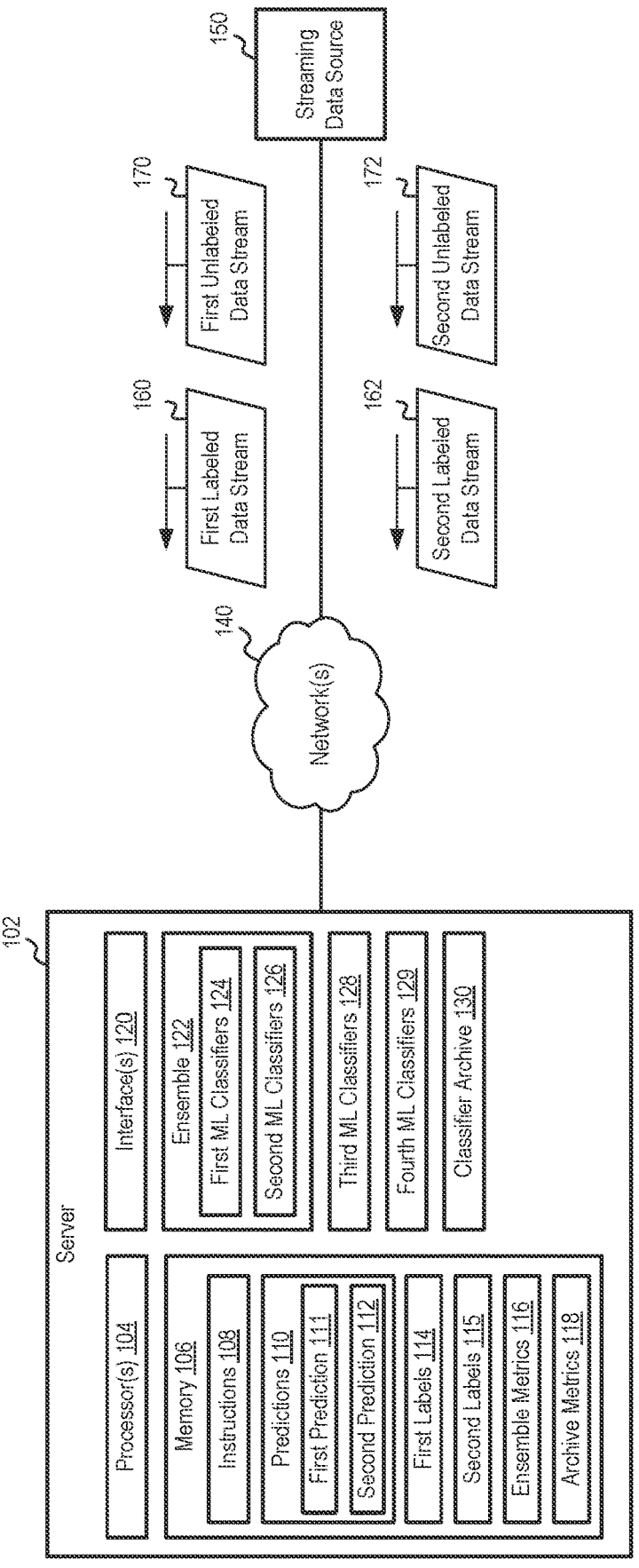
FIG. 1 is a block diagram of an example of a system that supports dynamically updating an ensemble of machine learning (ML) classifiers according to one or more aspects.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Aspects of the present disclosure provide systems, methods, apparatus, and computer-readable storage media that support dynamically updated ensemble-based machine learning (ML) classification. For example, a plurality of trained ML models may be ensembled (e.g., combined) to create an ensemble of ML models that is configured to output predictions (e.g., classifications) based on input data streams. The plurality of trained ML models may include multiple sets of one or more ML classifiers that are trained using different data sets with different statistical properties, and the ensemble of ML models may combine the output predictions into an overall prediction (e.g., by averaging, weighting, summing, using additional ML models to ensemble the outputs, etc.). The ensemble of ML models may be used to output predictions for unlabeled data streams as they are received. Additionally, the unlabeled data streams may be separately processed or analyzed to generate corresponding labels, and new sets of ML models may be trained using unlabeled data streams once the corresponding labels are obtained. The new sets of ML models may replace older sets of ML models in the ensemble, such that the ensemble of ML models is continually and dynamically updated with ML models trained based on newer data streams. Additionally, ML models that are removed from the ensemble of ML models may be stored in an archive for re-introduction if current data streams begin to resemble the older data streams on which the archived ML models were trained.

Aspects disclosed herein describe an incrementally learned ML classifier using streaming data. Such an ML model may be leveraged to solve a binary classification problem in the data streaming context, such as predicting credit card fraud based on collected data as an illustrative example. Aspects described herein may detect concept drift in the streaming data, create a trained ensemble of ML classifiers, and apply that ensemble in prediction tasks while trying to reduce, or eliminate, catastrophic forgetting (i.e., by retaining previous knowledge gained in all preceding ML models built on continuous data streams). For concept drift detection, the ML model may apply Hoeffding's bounds with a moving average-test technique, for ensemble building the ML model may use a combination of Hoeffding Tree Classifiers, Hoeffding Tree Adaptive Classifiers, and Extremely Fast Decision Tree Classifiers, in some implementations. Thus, the incrementally learned ML model as described herein may retain usefulness over a time period even if the data pattern changes during the time period.

One important difficulty in conventional ML models that is addressed by the updated ML model of the present disclosure, as further described herein, is the probable presence of concept drift in the incoming data stream. Concept drift refers to the change in statistical properties in the data stream as time elapses, similar to the way people's preferences and behaviors change over time in response to ever-changing socio-economic dynamics. Mathematically, concept drift can be denoted as, $P_t \neq P_{t+\Delta}$, where $P_t$ and $P_{t+\Delta}$ indicate the statistical distribution of data at time t and t+Δ, respectively. The statistical distribution of the data may change in such a manner that some classes, while deciding a class label, may not comply with previously derived decision boundaries within a specific feature space. The presence of concept drift causes problems because training data and test data profiles change over time for ML models, and thus the predictions output by the ML models become less accurate as time passes if the ML models are not updated. However, the updating of the ML model may cause the ML model to systematically forget previously learned knowledge, also referred to as the problem of catastrophic forgetting. Catastrophic forgetting is a typical problem encountered in many ML algorithms. For example, an ML model trained on one task (e.g., an "old task") and then subsequently trained on another task (e.g., a "new task") may "forget" how to work on the original task (old task). Catastrophic forgetting is widely acknowledged to be a serious problem with conventional ML models.

Statisticians, as well as ML engineers, have mostly been concerned with fitting an ML model to an available training dataset and deploying the ML model into production. Thus, there is a need for designing ML models that are able to update themselves whenever new data is available while, at the same time, trying to address catastrophic forgetting. Aspects of the present disclosure describe an ML architecture on a binary classification problem in a streaming data context that dynamically updates to mitigate the effect of concept drift in the data as well as address the effect of the catastrophic forgetting. As such, the dynamically updating ensemble-based ML models described herein may provide more accurate predictions for high volume streaming data while mitigating both concept drift and catastrophic forgetting, thereby providing significant improvements over conventional ML models.

Referring to FIG. 1, an example of a system that supports dynamically updating an ensemble of ML classifiers according to one or more aspects is shown as a system 100. The system 100 may be configured to dynamically update an ensemble of ML classifiers based on unlabeled streaming data. Although described in the context of ML classification, one or more aspects described herein may be leveraged to support dynamic updating of other types of ML tasks, such as regression, clustering, estimation, visualization, projection, or the like. As shown in FIG. 1, the system 100 includes a server 102, a streaming data source 150, and one or more networks 140. In some implementations, the system 100 may include additional components that are not shown in FIG. 1, such as one or more client devices, additional streaming data sources, and/or a database configured to store received data streams, labels, training data, predictions, an archive of ML classifiers, or a combination thereof, as non-limiting examples.

The server 102 may be configured to support one or more ML services, such as an ML classification service (e.g., prediction service). Although described as a server, in other implementations the server 102 may include or correspond to a desktop computing device, a laptop computing device, a personal computing device, a tablet computing device, a mobile device (e.g., a smart phone, a tablet, a personal digital assistant (PDA), a wearable device, and the like), a server, a virtual reality (VR) device, an augmented reality (AR) device, an extended reality (XR) device, a vehicle (or a component thereof), an entertainment system, other computing devices, or a combination thereof, as non-limiting examples. The server 102 includes one or more processors 104, a memory 106, one or more communication interfaces 120, an ensemble 122 of ML classifiers, and a classifier archive 130. In some other implementations, one or more of the components may be optional, one or more additional components may be included in the server 102, or both. It is noted that functionalities described with reference to the server 102 are provided for purposes of illustration, rather than by way of limitation, and that the exemplary functionalities described herein may be provided via other types of computing resource deployments. For example, in some implementations, computing resources and functionality described in connection with the server 102 may be provided in a distributed system using multiple servers or other computing devices, or in a cloud-based system using computing resources and functionality provided by a cloud-based environment that is accessible over a network, such as the one of the one or more networks 140. To illustrate, one or more operations described herein with reference to the server 102 may be performed by one or more servers or a cloud-based system that communicates with one or more client or user devices.

The one or more processors 104 may include one or more microcontrollers, application specific integrated circuits (ASICs), field programmable gate arrays (FPGAs), central processing units (CPUs) having one or more processing cores, or other circuitry and logic configured to facilitate the operations of the server 102 in accordance with aspects of the present disclosure. The memory 106 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the server 102 may be stored in the memory 106 as instructions 108 that, when executed by the one or more processors 104, cause the one or more processors 104 to perform the operations described herein with respect to the server 102, as described in more detail below. Additionally, the memory 106 may be configured to store data and information, such as predictions 110, first labels 114, second labels 115, ensemble metrics 116, and archive metrics 118. Additionally or alternatively, the memory 106 and/or the one or more processors 104 may be configured to store one or more sets of ML classifiers (e.g., ML models), such as a first set of one or more ML classifiers (referred to herein as first ML classifiers 124), a second set of one or more ML classifiers (referred to herein as second ML classifiers 126), a third set of one or more ML classifiers (referred to herein as third ML classifiers 128), and a fourth set of one or more ML classifiers (referred to herein as fourth ML classifiers 129). Illustrative aspects of the predictions 110, the first labels 114, the second labels 115, the ensemble metrics 116, the archive metrics 118, the first ML classifiers 124, the second ML classifiers 126, the third ML classifiers 128, and the fourth ML classifiers 129 are described in more detail below.

The one or more communication interfaces 120 may be configured to communicatively couple the server 102 to the one or more networks 140 via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) communication standard, a 4th Generation (4G)/long term evolution (LTE) communication standard, a 5th Generation (5G) communication standard, and the like). In some implementations, the server 102 includes one or more input/output (I/O) devices that include one or more display devices, a keyboard, a stylus, one or more touchscreens, a mouse, a trackpad, a microphone, a camera, one or more speakers, haptic feedback devices, or other types of devices that enable a user to receive information from or provide information to the server 102. In some implementations, the server 102 is coupled to a display device, such as a monitor, a display (e.g., a liquid crystal display (LCD) or the like), a touch screen, a projector, a virtual reality (VR) display, an augmented reality (AR) display, an extended reality (XR) display, or the like. In some other implementations, the display device is included in or integrated in the server 102. In some other implementations, the server 102 is communicatively coupled to one or more client devices that include or are coupled to respective display devices.

The ensemble 122 of ML classifiers includes a plurality of trained ML classifiers that are configured to output predictions based on input unlabeled data. For example, the ensemble 122 may output a prediction of whether input data corresponds to a particular label or group, or which label/group of a plurality of labels/groups that the input data is predicted to correspond. As a non-limiting example, the ensemble 122 may be configured to predict whether input data representing customer data, transaction data, and the like represents a fraudulent credit card charge. The ensemble 122 of ML classifiers includes a plurality of trained ML classifiers. The trained ML classifiers may be implemented by one or more ML or artificial intelligence (AI) models, which may include or correspond to one or more neural networks (NNs), such as multi-layer perceptron (MLP) networks, convolutional neural networks (CNNS), recurrent neural networks (RNNs), deep neural networks (DNNs), long short-term memory (LSTM) NNs, or the like. In other implementations, the ML classifiers may be implemented as one or more other types of ML models, such as support vector machines (SVMs), decision trees, random forests, regression models, Bayesian networks (BNs), dynamic Bayesian networks (DBNs), naive Bayes (NB) models, Gaussian processes, hidden Markov models (HMMs), regression models, or the like. In some implementations, the ML classifiers may include or correspond to particular types of classifiers, such as Hoeffding Tree Classifiers, Hoeffding Tree Adaptive Classifiers, and Extremely Fast Decision Tree Classifiers, or a combination thereof. These particular ML classifiers may be selected due to change in statistical concepts related to Hoeffding bounds, which can very efficiently deal with high velocity data streams and are computationally efficient. In other implementations, the ML classifiers may include or correspond to other types of classifiers. In some implementations, the plurality of ML classifiers of the ensemble 122 includes multiple sets of one or more ML classifiers that are trained using set-specific training data, as further described herein. In some such implementations, each set of ML classifiers may include the same types of ML classifiers as each other set. For example, each set of ML classifiers may include a Hoeffding Tree Classifier, a Hoeffding Tree Adaptive Classifier, and an Extremely Fast Decision Tree Classifier. Alternatively, some sets of ML classifiers may include different types of ML classifiers than other sets.

The ensemble 122 may be configured to combine the outputs from the plurality of ML classifiers that are ensembled together (e.g., combined) to generate an overall output, such as a prediction. In some implementations, the ensemble 122 may include or correspond to a stack of the plurality of ML classifiers (e.g., a classifier stack). To illustrate operation of the ensemble 122, input data may be provided to each of the ML classifiers that are included in the ensemble 122 to generate a plurality of predictions, and a prediction that is output by the ensemble 122 may be based on the plurality of predictions. For example, the ensemble 122 may be configured to determine the output prediction based on the plurality of predictions using a voting scheme, a weighted voting scheme, an average, a weighted average, or the like. Additionally or alternatively, in addition to the plurality of ML classifiers, the ensemble 122 may include one or more other ML models that are trained to generate the output prediction for the ensemble 122 based on the plurality of predictions generated by the plurality of ML classifiers. For example, historical prediction data from the plurality of ML classifiers may be combined with labels (e.g., indicating the correct prediction) for use as training data to train one or more ML models to generate an output of the ensemble 122 based on outputs of the plurality of ML classifiers.

The classifier archive 130 is configured to store (e.g., archive) one or more sets of ML classifiers that are removed from the ensemble 122. For example, as the ensemble 122 is dynamically updated, newly trained ML classifiers may replace older ML classifiers in the ensemble 122. As the older ML classifiers are replaced and cycled out of the ensemble 122, these ML classifiers may be stored at the classifier archive 130. In some implementations, ML classifiers stored at the classifier archive 130 may be provided with incoming data to generate corresponding accuracy metrics, and if the accuracy metrics for one or more of the ML classifiers in the classifier archive 130 exceed respective accuracy metrics for the ML classifiers in the ensemble 122, one or more of the ML classifiers stored at the classifier archive 130 may be added back to the ensemble 122, as further described herein.

During operation of the system 100, the server 102 may initially configure the ensemble with a plurality of ML classifiers that are trained using labeled data. To illustrate, the server 102 may receive a first labeled data stream 160 and a second labeled data stream 162 from the streaming data source 150. Although the server 102 is illustrated in FIG. 1 as receiving labeled data streams (i.e., data streams that are labeled by the streaming data source 150), in other implementations, the data streams 160 and 162 may be received without labels from the streaming data source 150, and the server 102 (or another device or entity) may analyze the data streams 160 and 162 to generate corresponding labels that are attached to create the first labeled data stream 160 and the second labeled data stream 162. The labels of the labeled data streams 160 and 162, whether generated by the server 102, the streaming data source 150, or another device not shown in FIG. 1, correspond to correct predictions (e.g., actual results) for the corresponding data streams. For example, if the data streams are indicative of transaction information used to predict fraud, the data streams may be labeled as fraudulent or non-fraudulent if the corresponding transactions were later determined to be fraudulent (or not). Although described as data streams, any of the data streams described herein may refer to individual data streams, portions of a common data streams, groupings of data packets, or any other portioning of data received during one or more time periods.

The server 102 may train sets of one or more ML classifiers based on different streams of the received labeled data streams. For example, the server 102 may train the first ML classifiers 124 based on the first labeled data stream 160. As another example, the server 102 may train the second ML classifiers 126 based on the second labeled data stream 162. Using the labeled data streams 160 and 162 as training data may train the first ML classifiers 124 and the second ML classifiers 126, respectively, to output a prediction based on input data. As a non-limiting example, the prediction may be whether transactions represented by input data correspond to fraudulent credit card charges or non-fraudulent purchases. Because the sets of ML classifiers are trained using different training data, the ML classifiers may output different predictions for the same input data. In some implementations, all of the sets of ML classifiers may include the same number and type of ML classifiers. In some implementations, each set of ML classifiers may include a Hoeffding Tree Classifier (HTC), a Hoeffding Tree Adaptive Classifier (HTAC), and an Extremely Fast Decision Tree Classifier (EFDTC). For example, the first ML classifiers 124 may include a first HTC, a first HTAC, and a first EFDTC, and the second ML classifiers 126 may include a second HTC, a second HTAC, and a second EFDTC. Each ML classifier of the same set of ML classifiers may be trained using the same training data. In some other implementations, different sets of ML classifiers may include different types of ML classifiers, and the sets of ML classifiers may be trained using the same or different training data.

After training the first ML classifiers 124 and the second ML classifiers 126, the server 102 may ensemble the first ML classifiers 124 and the second ML classifiers 126 to create the ensemble 122 of ML classifiers. As described above, ensembling ML classifiers may include combining outputs of the plurality of ML classifiers to generate an output of the ensemble 122, such as using a voting procedure, weighted voting, averaging, weighted averaging, trained ML models, or the like. Including the first ML classifiers 124 and the second ML classifiers 126 in the ensemble 122 enables the ensemble 122 of ML classifiers to generate the predictions 110 based on input data, such as a prediction of a classification belonging to the input data based on patterns and knowledge learned from the training data. Once the first ML classifiers 124 and the second ML classifiers 126 are ensembled to create the ensemble 122, the ensemble 122 may be put into service to perform ML-based predictions. Although the ensemble 122 is described with reference to FIG. 1 as including two sets of ML classifiers, in other implementations, the ensemble 122 may include more than two sets of ML classifiers. For example, as further described with reference to FIGS. 3A-B, the ensemble 122 may include three sets of ML classifiers at a given time, each set including three ML classifiers. The number of ML classifiers included in the ensemble 122 may be selected based on available processing and/or memory resources at the server 102, target performance metrics of the ensemble 122, user selection, other factors, or a combination thereof. In some implementations, the number of ML classifiers included in the ensemble 122 at a time is preset or otherwise preconfigured at the server 102. Alternatively, the number of ML classifiers included in the ensemble 122 may be dynamically changed, such as based on performance or other factors.

After the ensemble 122 of ML classifiers is put into service, the server 102 may begin receiving unlabeled streaming data for generating predictions. For example, the server 102 may receive a first unlabeled data stream 170 from the streaming data source 150. The server 102 may provide the first unlabeled data stream 170 as input to the ensemble 122 of ML classifiers to generate a first prediction 111 of the predictions 110. As a non-limiting example, the first prediction 111 may be a prediction of whether the first unlabeled data stream 170 represents transactions that correspond to credit card fraud. Although described as a single prediction, the ensemble 122 may output multiple predictions for the first unlabeled data stream 170, such as respective predictions for multiple different portions of the first unlabeled data stream 170. In some such implementations, the server 102 may be configured to subdivide data streams into one or multiple portions based on factors such as receipt time, account numbers, source, data type, or the like. Additionally, the server 102 may initiate a process of labeling the first unlabeled data stream 170. For example, the server 102 may initiate a second, more rigorous fraud analysis process using the first unlabeled data stream 170. Alternatively, the server 102 may provide the first unlabeled data stream 170 to another device for automatic, manual, or a hybrid automatic and manual analysis to label the first unlabeled data stream 170.

While the first unlabeled data stream 170 is being labeled, the server 102 may receive one or more additional unlabeled data streams. The server 102 may provide the additional unlabeled data streams as input data to the ensemble 122 to generate one or more additional predictions of the predictions 110. Additionally, the server 102 may initiate a labeling process (e.g., an analysis process) for each of the received unlabeled data streams, similar to the process for the first unlabeled data stream 170. For example, the server 102 may receive a second unlabeled data stream 172 before labels are obtained for the first unlabeled data stream 170. The server 102 may provide the second unlabeled data stream 172 as input data to the ensemble 122 to generate one or more of the predictions 110. Additionally, the server 102 may initiate a process of labeling the second unlabeled data stream 172. If any additional unlabeled data streams are received, the unlabeled data streams may be similarly processed by the server 102.

After completion of the labeling process for the first unlabeled data stream 170, the server 102 may obtain (e.g., receive or determine) the first labels 114 that correspond to the first unlabeled data stream 170. The server 102 may use the first labels 114 and the first unlabeled data stream 170 as training data to train the third ML classifiers 128. In some implementations, the third ML classifiers 128 include the same number and types of ML classifiers as the first ML classifiers 124 and the second ML classifiers 126. As a non-limiting example, the third ML classifiers 128 may include a third HTC, a third HTAC, and a third EFDTC. After the training of a new set of ML classifiers is complete, the server 102 may replace the oldest set of ML classifiers in the ensemble 122 with the new set of ML classifiers. For example, the server 102 may replace the first ML classifiers 124 in the ensemble 122 with the third ML classifiers 128. Replacing a set of ML classifiers in the ensemble 122 with another set of ML classifiers may remove an existing set of ML classifiers from the ensemble 122 and add the other set of ML classifiers to the ensemble 122. For example, after the replacement, the ensemble 122 includes the second ML classifiers 126 and the third ML classifiers 128 (e.g., the first ML classifiers 124 are removed). In some implementations, when replacing a set of ML classifiers in the ensemble 122 with a new set of ML classifiers, the server 102 replaces the oldest set of ML classifiers remaining in the ensemble 122. As such, in some implementations, timestamps or other ordering information may be maintained to indicate the order in which ML classifiers are added to the ensemble 122. Additionally or alternatively, the server 102 may replace the set of ML models having the lowest performance, the set of ML models associated with the lowest weight, or according to any other replacement scheme.

After dynamically updating the ensemble 122 (e.g., replacing one or more sets of ML classifiers), the server 102 may use the updated ensemble 122 of ML classifiers in performing predictions based on unlabeled data streams. For example, after updating the ensemble 122, the server 102 may receive an additional unlabeled data stream. The server 102 may provide the additional unlabeled data stream as input data to the updated ensemble 122 to generate a second prediction 112 of the predictions 110. Because older ML classifiers are cycled out (e.g., via replacement) of the ensemble 122, the predictions output by the ensemble 122 are based on more recently learned knowledge as time progresses, such that the ensemble 122 is continually updated. This continual dynamic updating enables the ensemble 122 to account for concept drift in received data, as changes in statistical distributions over time in the streaming data are learned through the continual updating process.

The server 102 may perform similar operations for each unlabeled data stream that is received. To illustrate, unlabeled data streams may be received and fed as input data to the ensemble 122 of ML classifiers until labeling of the second unlabeled data stream 172 is complete. At this point, the server 102 may obtain the second labels 115 that correspond to the second unlabeled data stream 172, and the server 102 may provide the second labels 115 and the second unlabeled data stream 172 as training data to train the fourth ML classifiers 129 to generate predictions based on input data, similar to as described for the third ML classifiers 128. The server 102 may replace the second ML classifiers 126 with the fourth ML classifiers 129, such that the ensemble includes the third ML classifiers 128 and the fourth ML classifiers 129 after the replacement (e.g., after updating). After the updating of the ensemble 122, predictions are based on knowledge learned from the unlabeled data streams 170-172, as compared to being based on knowledge learned from the labeled data streams 160-162 when the ensemble 122 includes the first ML classifiers 124 and the second ML classifiers 126. This process of training new ML classifiers based on received data streams once labels are obtained may continue, as further described with reference to FIGS. 3A-B.

In some implementations, the server 102 may store ML models that are removed from the ensemble 122 in the classifier archive 130. For example, the server 102 may store the first ML classifiers 124 in the classifier archive 130 when the first ML classifiers 124 are removed from the ensemble 122 (e.g., when the first ML classifiers 124 are replaced with the third ML classifiers 128). As another example, the server 102 may store the second ML classifiers 126 in the classifier archive 130 when the second ML classifiers 126 are removed from the ensemble 122 (e.g., when the second ML classifiers 126 are replaced with the fourth ML classifiers 129). Archived ML classifiers may be returned (e.g., re-added or otherwise brought back) to the ensemble 122 of ML classifiers if performance of the archived ML classifiers exceeds performance of the ML classifiers currently included in the ensemble 122. To illustrate, the server 102 may provide received data streams as input data to the ensemble 122 and to the ML classifiers stored in the classifier archive 130, and the predictions generated by the various ML classifiers may be compared to corresponding labels to generate performance metrics. For example, the ensemble metrics 116 may include accuracy, processing time, memory footprint, or the like, for the ML classifiers included in the ensemble 122, and the archive metrics 118 may include similar metrics for the ML classifiers stored in the classifier archive 130. If the archive metrics 118 exceed the ensemble metrics, one or more sets of ML classifiers stored in the classifier archive 130 may be reintroduced to the ensemble 122, such as by replacing one or more lowest scoring sets of ML classifiers, one or more oldest ML classifiers, or the like, in the ensemble 122. Alternatively, ML classifiers stored in the classifier archive 130 may be reintroduced based on the archive metrics 118 satisfying (e.g., being greater than or equal to) one or more thresholds. Archiving older (or otherwise removed) ML classifiers in the classifier archive 130 for possible re-introduction to the ensemble 122 may reduce, or prevent, catastrophic forgetting as previously learned knowledge is not entirely replaced by newer learned knowledge.

As described above, the system 100 supports a dynamically updated ensemble of ML classifiers (e.g., the ensemble 122) that provides benefits compared to conventional ML classifiers. For example, by ensembling multiple sets of ML classifiers that are trained on different data streams (e.g., portions of data), the ensemble 122 may provide more accurate predictions over a longer time window than ML classifier(s) trained using an entirety of the original training data. Stated another way, the ensemble 122 may retain representative subsets from previous chunks of data in earlier streams. Additionally, because the ensemble 122 is dynamically updated to replace older sets of ML classifiers with ML classifiers trained on newer data streams (e.g., portions of data), the ensemble 122 is able to learn changes in statistical distributions of incoming data over time. This dynamic updating of the ensemble 122 may reduce, or eliminate, performance degradation due to concept drift, particular in the context of streaming data that can include a large volume of data in which statistical distributions (or other relevant properties) incrementally change over time. As such, data may be selected through custom-clustering leading to earlier information-retention by way of persisting representative sub-samples for aiding in ensemble knowledge retention and for retaining input-output relationship patterns by way of collaborating current model learnings with configurable numbers of previous model learnings. As a particular example, by replacing the first ML classifiers 124 with the third ML classifiers 128, the ensemble 122 may have improved performance as compared to static ML classifiers, which may degrade in performance due to concept drift from a time period of the first labeled data stream 160 to the first unlabeled data stream 170. Thus, the ensemble 122 is continually updated with ML classifiers that are trained on time-windowed datasets having concept drift. Additionally or alternatively, at least some implementations of the system 100 retain knowledge learned by the ensemble 122 longer than other ML classifiers, which may improve performance. To illustrate, when ML classifiers are removed from the ensemble 122 (e.g., due to replacement during dynamic updating), the removed ML classifiers may be stored in the classifier archive 130. If ML classifiers stored in the classifier archive 130 perform better than ML classifiers presently included in the ensemble 122, one or more of the stored ML classifiers may be reintroduced into the ensemble 122. If statistical distribution or patterns in received data return to previous distributions/patterns, the ensemble 122 can reintroduce one or more archived ML classifiers in order to account for this change, without waiting for the incoming data to be labeled and new ML classifiers to be trained. In this manner, the system 100 retains previously learned knowledge for re-introduction into the ensemble 122 when useful, which may reduce, or eliminate, performance degradation due to catastrophic forgetting, particularly if the concept drift is cyclic. Additionally or alternatively, increasing the number of ML classifiers included in the ensemble 122 may reduce, or eliminate, performance degradations due to catastrophic forgetting.

Figure 2:
FIG. 2 shows a block diagram of an example of a system that supports a dynamically updated ensemble of ML models according to one or more aspects.

Referring to FIG. 2, an example of a system that supports a dynamically updated ensemble of ML models according to one or more aspects is shown as a system 200. The system 200 (e.g., an ML architecture) includes a dynamically updated ensemble 202 of ML models, labeled data streams 204, unlabeled data streams 206, newly trained ML models 208, predictions 210, and an archive 212 of older ML models. In some implementations, the system 200 (or components thereof) may include or correspond to the system 100 of FIG. 1. For example, the ensemble 202 may include or correspond to the ensemble 122, the labeled data streams 204 may include or correspond to the first labeled data stream 160 and the second labeled data stream 162, and the unlabeled data streams 206 may include or correspond to the first unlabeled data stream 170 and the second unlabeled data stream 172.

As shown in FIG. 2, the system 200 is configured with an updating mechanism for ML models (e.g., an ensemble of ML models). To illustrate, the ensemble 202 of multiple ML models (e.g., ML models configured to perform classification tasks) is first trained based on the labeled data streams 204 (e.g., available labeled data). In some implementations, multiple different sets of one or more ML models of the ensemble 202 are trained using different portions (e.g., streams) of the labeled data streams 204. After the training (e.g., creation), as the unlabeled data streams 206 arrive, the unlabeled data streams 206 go through concept drift detection and are tested on the streaming classifiers that were previously built (e.g., the ML models currently in the ensemble 202). Additionally, the newly trained ML models 208 are trained based on the received data streams when corresponding labels become available, and the newly trained ML models 208 are appended to the ensemble 202 (e.g., a stack of currently available ML models). In this manner, the ensemble 202 is continuously and dynamically updated as additional data streams are received. Prediction tasks are performed by the ensemble 202 to generate the predictions 210. In some implementations, when the newly trained ML models 208 are added to the ensemble 202, older ML models may be removed and stored in the archive 212 for possible later reintroduction into the ensemble 202.

Data preparation can be an important part of any ML solution. ML models typically require transformations to be performed on raw data, usually through various preprocessing operations, and sometimes further through selection of relevant data before it can be fed into the ML models. It may be beneficial to avoid high skewed datasets to improve performance of the ML models, at least because a highly skewed dataset can misrepresent the performance measures of the classification algorithm. Therefore, in some implementations, Synthetic Minority Oversampling Technique (SMOTE) may be applied to the received data streams (at least the labeled data streams 204) to augment the data streams such that the various labels occur in similar quantities. For example, for training ML models to identify fraudulent transactions, the labeled data streams 204 may be augmented using SMOTE operations such that the number of fraud and non-fraud transactions are approximately the same. SMOTE is one of approach to address imbalanced datasets by oversampling the minority class, in particular by making duplicate examples in the minority class by artificially generating new examples that closely resemble existing examples.

A window can be defined as a subset of data. The window can be based on the number of observations, or time slots. Windowing is a popular technique in the streaming data context because the volume of data is continuously growing and accessing the entire data set may be computationally prohibitive while the streaming is in progress. An incremental learning model (e.g., the ML models of the ensemble 202 or the newly trained ML models 208) may be created by using a windowing technique. In some implementations, the ML models described herein may be implemented using a sliding window, a damped window, a landmark window, or the like. In some implementations, the sliding window is selected due to tradeoffs between complexity and performance of the ML models.

As described above, conventional ML models have difficulty dealing with concept drift in the input data, meaning the statistical properties of data streams change over time but the patterns and knowledge learned by the ML models do not. Therefore, ML models trained on past data may lose their usefulness if training and test data profile do not match. The changes in the input data streams can be either gradual or abrupt. In some implementations, drift detection methods used herein are based on Hoeffding's bounds with moving average-test (HDDM_A). HDDM_A is a drift detection method based on Hoeffding's inequality. In some other implementations, other drift detection methods may be used, such as Adaptive Windowing Method for concept drift detection (ADWIN), Drift Detection Method (DDM), Early Drift Detection Method (EDDM), Drift Detection Method based on Hoeffding's bounds with moving weighted average-test (HDDM_W), Kolmogorov-Smirnov Windowing method for concept drift detection (KSWIN), Page-Hinkley method for concept drift detection, or the like. Due to using HDDM_A, some implementations described herein include training sets of ML classifiers that each include a Hoeffding Tree Classifier, a Hoeffding Tree Adaptive Classifier, and an Extremely Fast Decision Tree Classifier. Hoeffding Tree Classifiers work recursively every time new data arrives in the stream. Hoeffding Tree Classifiers use Hoeffding bounds for construction and analysis of decision trees that make the models less time-consuming. Hoeffding Tree Classifiers are capable of learning from massive data streams. Hoeffding Tree Adaptive Classifiers use the ADWIN method to monitor the error of each subtree and alternate trees and are a modified version of Hoeffding trees. Hoeffding Tree Adaptive Classifiers use the ADWIN estimates to make decisions on leaves and on growing new trees or alternate trees. Hoeffding Adaptive Tree Classifiers can be used for data streams associated with concept drift. Extremely Fast Decision Tree Classifiers are incremental decision trees and are almost similar to Hoeffding Trees, but they differ in the way the decision trees split at the nodes. Hoeffding Trees delay the split at a node until they identify the best split and do not revisit the decision. Extremely Fast Decision Tree Classifiers split at a node as soon as they find a useful split and revisit the decision if a better split is possible.

In some implementations, instead of using all the received data as training data or input data, data may be selected through custom clustering, such as from the labeled data streams 204 and/or the unlabeled data streams 206. Such custom clustering may improve (e.g., optimize) process-overhead. In some such implementations, the custom clustering includes calculating a first centroid as an average of all profiles. Next, the similarity between the first centroid and all profiles may be calculated using a selected similarity measure. The profile that is least like the first centroid may be picked to be the second centroid. Next, the similarity between the second centroid and all remaining profiles may be calculated. The profiles that are more similar to the second centroid than the first centroid may be assigned to the second centroid and not be investigated any further. Of the remaining profiles, the profile that is least like the first centroid is selected as a third centroid. Similarities between the third centroid and all remaining profiles may be determined, and the profiles that are more similar to the third centroid may be assigned to the third centroid for no further investigation. Additional centroids may be similarly defined and profiles assigned thereto, until a specified number of clusters are reached, or there are no more profiles left to assign. Finally, representative samples may be selected from each time-window and persisted.

Figure 3A:
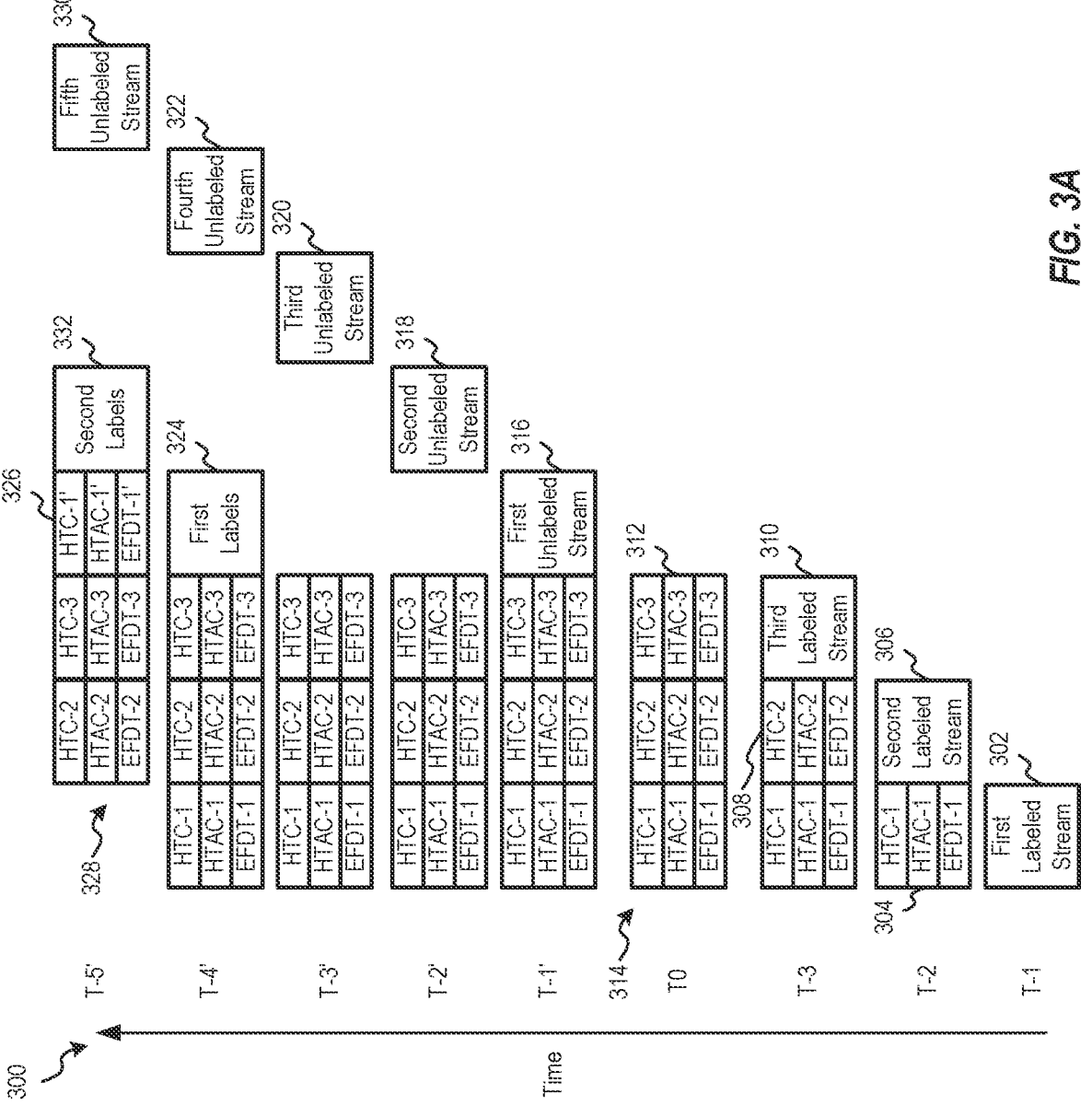
FIGS. 3A-B illustrate an example of dynamically updating an ensemble of ML classifiers according to one or more aspects.
Figure 3B:
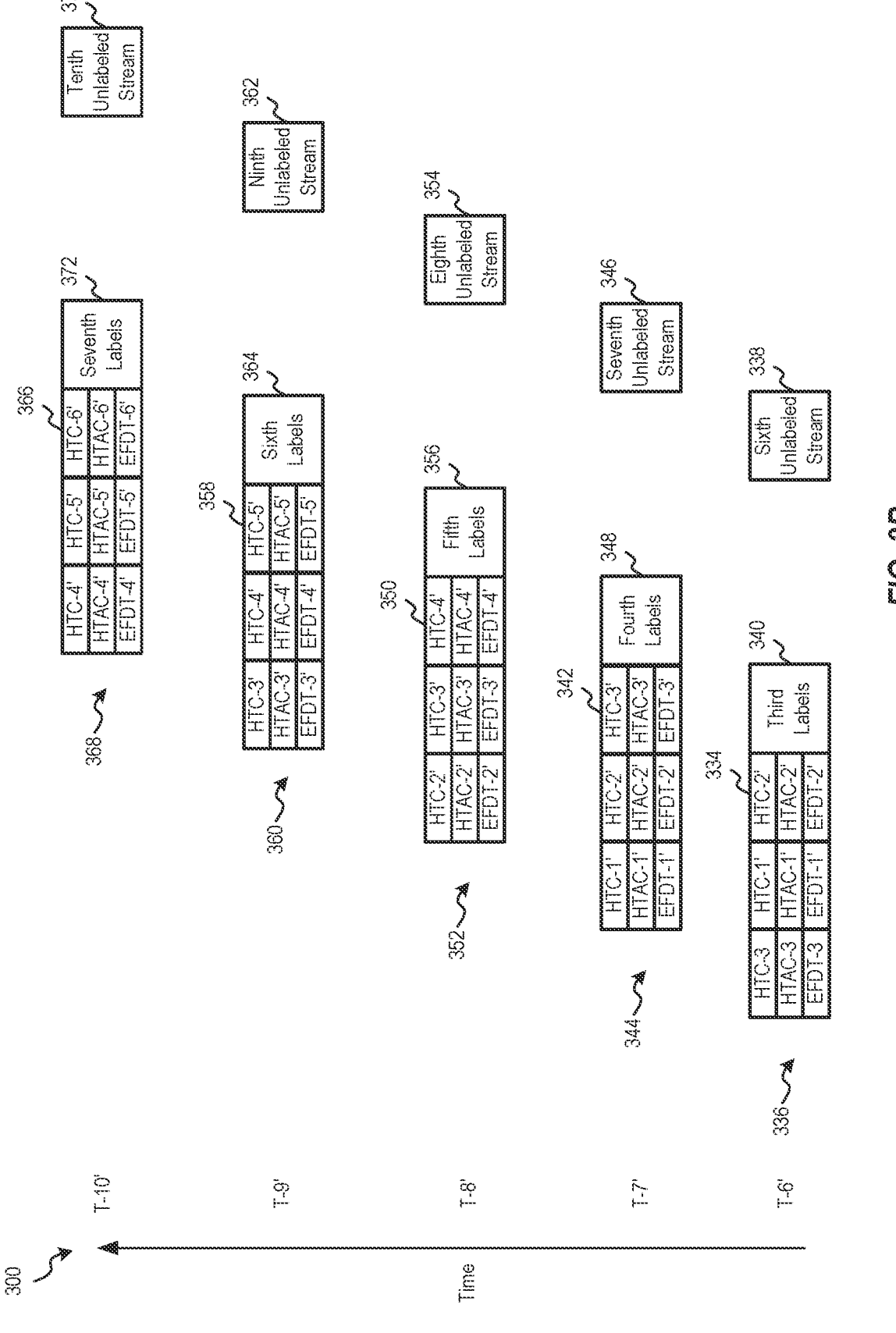

FIGS. 3A-B illustrate an example 300 of dynamically updating an ensemble of ML classifiers according to one or more aspects. In some implementations, one or more operations described with reference to FIGS. 3A-B may be performed by one or more of the components of the system 100 of FIG. 1 or the system 200 of FIG. 2. Although particular types of ML classifiers are described with reference to FIGS. 3A-B, in some other implementations, the operations described with reference to FIGS. 3A-B may be performed using other types of ML classifiers or ML models. Additionally or alternatively, although an ensemble is described as including three sets of ML classifiers, each set having 3 ML classifiers, in some other implementations, the ensemble may include fewer than three or more than three sets of ML classifiers, and/or each set of ML classifiers may include fewer than three or more than three ML classifiers. However, the number of classifiers selected for inclusion in the ensemble should be made such that the predictions determined by the ensemble do not become too computationally expensive and time-consuming, as one goal of a streaming classifier is that the predictions can be made just-in-time (e.g., in real-time or near real-time) as the streaming data is received.

As shown in FIG. 3A, operations begin when a first labeled data stream 302 is received, at time T-1. Although described as a labeled data stream, in other implementations, the data stream may be unlabeled when received, and labels may be obtained for the data stream at time T-1, as described above with reference to FIGS. 1-2. First ML classifiers 304 may be trained based on the first labeled data stream 302. In a particular implementation, the first ML classifiers include a first Hoeffding Tree Classifier ("HTC-1"), a first Hoeffding Tree Adaptive Classifier ("HTAC-1"), and a first Extremely Fast Decision Tree Classifier ("EFDT-1"). The first ML classifiers 304 are put into service and a second labeled data stream 306 is received, at time T-2. Second ML classifiers 308 (HTC-2, HTAC-2, and EFDT-2) may be trained based on the second labeled data stream 306. The second ML classifiers 308 are put into service and a third labeled data stream 310 is received, at time T-3. Third ML classifiers 312 (HTC-3, HTAC-3, and EFDT-3) may be trained based on the third labeled data stream 310. After the third ML classifiers 312 are put into service, an ensemble 314 is created by ensembling the first ML classifiers 304, the second ML classifiers 308, and the third ML classifiers 312, at time TO. Although described as separate operations at distinct times, in some other implementations, receipt of the labeled data streams 302, 306, and 310 and training of the ML classifiers 304, 308, and 312 may be performed partially, or entirely, concurrently.

After the ensemble 314 is created, the ensemble 314 may be used to provide predictions based on unlabeled streaming data from one or more streaming data sources. To illustrate, a first unlabeled data stream 316 may be received, at time T-1', and provided as input data to the ensemble 314 to generate prediction(s) based on the first unlabeled data stream 316. Additionally, a process to obtain labels for the first unlabeled data stream 316 may be initiated at time T-1'. While labels are being obtained for the first unlabeled data stream 316, additional unlabeled data streams may be received and similar operations performed. To illustrate, a second unlabeled data stream 318 may be received and provided as input data to the ensemble 314 to generate prediction(s) based on the second unlabeled data stream 318, and a label obtaining process for the second unlabeled data stream 318 may be initiated, at time T-2'. A third unlabeled data stream 320 may be received and provided as input data to the ensemble 314 to generate prediction(s) based on the third unlabeled data stream 320, and a label obtaining process for the third unlabeled data stream 320 may be initiated, at time T-3'.

First labels 324 for the first unlabeled data stream 316 may be obtained, at time T-4'. Although the label obtaining process is shown as taking three time increments (e.g., time periods of receiving three unlabeled data streams) in FIG. 3A, in other implementations, the label obtaining process may take fewer than three or more than three time increments. Fourth ML classifiers 326 (HTC-1', HTAC-1', and EFDT-1') may be trained based on the first labels 324 and the first unlabeled data stream 316 (e.g., based on a labeled data stream formed by combining the first labels 324 with the first unlabeled data stream 316). Additionally, a fourth unlabeled data stream 322 may be received and provided as input data to the ensemble 314 to generate prediction(s) based on the fourth unlabeled data stream 322, and a label obtaining process for the fourth unlabeled data stream 322 may be initiated, at time T-4'. After the fourth ML classifiers 326 are trained, the ensemble 314 may be updated based on the fourth ML classifiers 326 to generate an updated ensemble 328. In some implementations, updating the ensemble 314 may include replacing the oldest set of ML classifiers in the ensemble 314 with a new set of ML classifiers that are trained based on more recently received data. For example, the first ML classifiers 304 may be replaced with the fourth ML classifiers 326. In some implementations, the first ML classifiers 304 may be stored in a classifier archive after being removed from the ensemble 314, as further described above with reference to FIG. 1.

After the updating, the updated ensemble 328 (e.g., the second ML classifiers 308, the third ML classifiers 312, and the fourth ML classifiers 326) may be used to generate predictions based on received data, and dynamic updating may continue as additional labels are obtained. To illustrate, a fifth unlabeled data stream 330 may be received, at time T-5', and provided as input data to the updated ensemble 328 to generate prediction(s) based on the fifth unlabeled data stream 330, and a label obtaining process for the fifth unlabeled data stream 330 may be initiated. Additionally, second labels 332 may be obtained for the second unlabeled data stream 318, at time T-5'. Fifth ML classifiers 334 may be trained based on the second labels 332 and the second unlabeled data stream 318, and the ensemble 328 may be updated by replacing the second ML classifiers 308 with the fifth ML classifiers 334 to generate an updated ensemble 336. In some implementations, the second ML classifiers 308 may be stored in the classifier archive after being removed from the ensemble 328.

Continuing to FIG. 3B, similar operations may be performed as additional unlabeled data streams are received and additional labels are obtained. To illustrate, a sixth unlabeled data stream 338 may be received, at time T-6', and provided as input data to the updated ensemble 336 (e.g., the third ML classifiers 312, the fourth ML classifiers 326, and the fifth ML classifiers 334) to generate prediction(s) based on the sixth unlabeled data stream 338, and a label obtaining process for the sixth unlabeled data stream 338 may be initiated. Additionally, third labels 340 may be obtained for the third unlabeled data stream 320, at time T-6'. Sixth ML classifiers 342 may be trained based on the third labels 340 and the third unlabeled data stream 320, and the ensemble 336 may be updated by replacing the third ML classifiers 312 with the sixth ML classifiers 342 to generate an updated ensemble 344. In some implementations, the third ML classifiers 312 may be stored in the classifier archive after being removed from the ensemble 336. A seventh unlabeled data stream 346 may be received, at time T-7', and provided as input data to the updated ensemble 344 (e.g., the fourth ML classifiers 326, the fifth ML classifiers 334, and the sixth ML classifiers 342) to generate prediction(s) based on the seventh unlabeled data stream 346, and a label obtaining process for the seventh unlabeled data stream 346 may be initiated. Additionally, fourth labels 348 may be obtained for the fourth unlabeled data stream 322, at time T-7'. Seventh ML classifiers 350 may be trained based on the fourth labels 348 and the fourth unlabeled data stream 322, and the ensemble 344 may be updated by replacing the fourth ML classifiers 326 with the seventh ML classifiers 350 to generate an updated ensemble 352. In some implementations, the fourth ML classifiers 326 may be stored in the classifier archive after being removed from the ensemble 344. An eighth unlabeled data stream 354 may be received, at time T-8', and provided as input data to the updated ensemble 352 (e.g., the fifth ML classifiers 334, the sixth ML classifiers 342, and the seventh ML classifiers 350) to generate prediction(s) based on the eighth unlabeled data stream 354, and a label obtaining process for the eighth unlabeled data stream 354 may be initiated. Additionally, fifth labels 356 may be obtained for the fifth unlabeled data stream 330, at time T-8'. Eighth ML classifiers 358 may be trained based on the fifth labels 356 and the fifth unlabeled data stream 322, and the ensemble 352 may be updated by replacing the fifth ML classifiers 334 with the eighth ML classifiers 358 to generate an updated ensemble 360. In some implementations, the fifth ML classifiers 334 may be stored in the classifier archive after being removed from the ensemble 352.

A ninth unlabeled data stream 362 may be received, at time T-9', and provided as input data to the updated ensemble 360 (e.g., the sixth ML classifiers 342, the seventh ML classifiers 350, and the eighth ML classifiers 358) to generate prediction(s) based on the ninth unlabeled data stream 362, and a label obtaining process for the ninth unlabeled data stream 362 may be initiated. Additionally, sixth labels 364 may be obtained for the sixth unlabeled data stream 338, at time T-9'. Ninth ML classifiers 366 may be trained based on the sixth labels 364 and the sixth unlabeled data stream 338, and the ensemble 360 may be updated by replacing the sixth ML classifiers 342 with the ninth ML classifiers 366 to generate an updated ensemble 368. In some implementations, the sixth ML classifiers 342 may be stored in the classifier archive after being removed from the ensemble 360. A tenth unlabeled data stream 370 may be received, at time T-10', and provided as input data to the updated ensemble 368 (e.g., the seventh ML classifiers 350, the eighth ML classifiers 358, and the ninth ML classifiers 366) to generate prediction(s) based on the tenth unlabeled data stream 370, and a label obtaining process for the tenth unlabeled data stream 370 may be initiated. Additionally, seventh labels 372 may be obtained for the seventh unlabeled data stream 346, at time T-10'. Tenth ML classifiers may be trained based on the seventh labels 372 and the seventh unlabeled data stream 346, and the ensemble 368 may be updated by replacing the seventh ML classifiers 350 with the tenth ML classifiers. In some implementations, the seventh ML classifiers 350 may be stored in the classifier archive after being removed from the ensemble 368. Similar operations may be performed to continually, dynamically update an ensemble of ML classifiers based on recently received data streams. In some implementations, at one or more of the times T-5' to T-10', metrics may be determined for the ML classifiers currently in the ensemble and for ML classifiers stored in the classifier archive, and if the metrics for the ML classifiers stored in the classifier archive exceed the metrics for the ML classifiers currently in the ensemble (or one or more threshold), one or more sets of ML models from the classifier archive may be reintroduced to the ensemble, either by replacing one or more oldest or lowest performing sets of ML models in the ensemble, or by increasing the size of the ensemble.

As described above with reference to FIGS. 3A-B, an ensemble of ML classifiers may collectively retain older knowledge and, at the same time, incrementally learn new knowledge. To illustrate, knowledge patterns may be learned using an ensemble of tree-based ML classifiers that are pre-trained using a combination of historical data chunks having different data distributions. This ensemble of pre-trained tree-based ML classifiers may be dynamically updated during actual deployment based on prediction performance. The ensemble may keep the most recent configurable N models during runtime (e.g., post-deployment), where Nis dependent on the lead time taken for actual arrival of labels and actual performance. In the example shown in FIGS. 3A-B, Nis three. The choice of keeping the configurable N most recent models (e.g., the ensemble) strategy may be evaluated once the actual labels arrive and the actual performance validation is performed. Next, the option of re-choice of the most relevant ML classifiers (not just the most recent) may be examined based on the prediction performance, and the behaviour of historical and current data patterns and/or distribution if the prediction performance degrades. Systematic archival of earlier ML classifiers based on the validation and the performance may be carried out for recycling/reuse later depending on the resurgence of old data patterns (if any). If an old data pattern resurges, the ensemble selectively replaces some or all of the N most recent ML classifiers currently in deployment with alternative ML classifiers stored in an archive. The replacement of ML classifiers may be a subset or an entirety of N ML classifiers depending on the prediction performance evaluation.

Referring to FIG. 4, a flow diagram of an example of a method for dynamically updating an ensemble of ML classifiers according to one or more aspects is shown as a method 400. In some implementations, the operations of the method 400 may be stored as instructions that, when executed by one or more processors (e.g., the one or more processors of a computing device or a server), cause the one or more processors to perform the operations of the method 400. In some implementations, the method 400 may be performed by a computing device, such as the server 102 of FIG. 1 (e.g., a computing device configured for dynamic ensembling of ML models), the system 200 of FIG. 2, or a combination thereof.

The method 400 includes receiving a first unlabeled data stream, at 402. For example, the first unlabeled data stream may include or correspond to the first unlabeled data stream 170 of FIG. 1. The method 400 includes providing the first unlabeled data stream as input data to an ensemble of ML classifiers to generate a first prediction, at 404. The ensemble of ML classifiers includes a plurality of ML classifiers configured to generate predictions based on input data streams. For example, the ensemble of ML classifiers may include or correspond to the ensemble 122 of FIG. 1, and the first prediction may include or correspond to the first prediction 111 of FIG. 1. The method 400 includes receiving labels for the first unlabeled data stream, at 406. For example, the labels for the first unlabeled data stream may include or correspond to the first labels 114 of FIG. 1.

The method 400 includes training an additional set of one or more ML classifiers based on the labels for the first unlabeled data stream and the first unlabeled data stream, at 408. For example, the additional set of ML classifiers may include or correspond to the third ML classifiers 128 of FIG. 1. The method 400 includes replacing a first set of one or more ML classifiers of the plurality of ML classifiers of the ensemble of ML classifiers with the additional set of ML classifiers, at 410. For example, the first set of ML classifiers may include or correspond to the first ML classifiers 124 of FIG. 1.

The method 400 includes receiving an additional unlabeled data stream, at 412. For example, the additional unlabeled data stream may include or correspond to the second unlabeled data stream 172 of FIG. 1. The method 400 includes providing the additional unlabeled data stream as input data to the ensemble of ML classifiers to generate an additional prediction, at 414. For example, the additional prediction may include or correspond to the second prediction 112 of FIG. 1.

In some implementations, the method 400 also includes, prior to receiving the labels for the first unlabeled data stream, receiving a second data stream and providing the second unlabeled data stream as input data to the ensemble of ML classifiers to generate a second prediction. For example, the second unlabeled data stream may include or correspond to the second unlabeled data stream 172 of FIG. 1, and the second prediction may include or correspond to another prediction of the predictions 110 of FIG. 1. In some such implementations, the method 400 further includes, after generating the additional prediction, receiving labels for the second unlabeled data stream, training a second additional set of one or more ML classifiers based on the labels for the second unlabeled data stream and the second unlabeled data stream, and replacing a second set of one or more ML classifiers of the plurality of ML classifiers of the ensemble of ML classifiers with the second additional set of ML classifiers. For example, the labels for the second unlabeled data stream may include or correspond to the second labels 115 of FIG. 1, the second additional set of ML classifiers may include or correspond to the fourth ML classifiers 129 of FIG. 1, and the second set of ML classifiers may include or correspond to the second ML classifiers 126 of FIG. 1. In some such implementations, the method 400 also includes receiving, after replacing the second set of ML classifiers with the second additional set of ML classifiers, a second additional unlabeled data stream and providing the second additional unlabeled data stream as input data to the ensemble of ML classifiers to generate a second additional prediction. For example, after replacing the second ML classifiers 126 in the ensemble 122 with the fourth ML classifiers 129, an additional unlabeled data stream may be provided to the ensemble 122 to generate an additional prediction of the predictions 110 of FIG. 1.

In some implementations, each set of ML classifiers of the plurality of ML classifiers of the ensemble of ML classifiers includes multiple different types of ML classifiers. For example, each of the first ML classifiers 124, the second ML classifiers 126, the third ML classifiers 128, and the fourth ML classifiers 129 of FIG. 1 may include different types of ML classifiers. In some such implementations, the multiple different types of ML classifiers include Hoeffding Tree Classifiers, Hoeffding Tree Adaptive Classifiers, Extremely Fast Decision Tree Classifiers, other types of classifiers, or a combination thereof.

In some implementations, the method 400 also includes, prior to receiving the first unlabeled data stream, receiving at least a first labeled data stream and a second labeled data stream, training the first set of ML classifiers based on the first labeled data stream, training a second set of one or more ML classifiers based on the second labeled data stream, and ensembling at least the first set of ML classifiers and the second set of ML classifiers to create the ensemble of ML classifiers. For example, the first labeled data stream may include or correspond to the first labeled data stream 160 of FIG. 1, the second labeled data stream may include or correspond to the second labeled data stream 162 of FIG. 1, the first set of ML classifiers may include or correspond to the first ML classifiers 124 of FIG. 1, and the second set of ML classifiers may include or correspond to the second ML classifiers 126 of FIG. 1. In some such implementations, the first set of ML classifiers includes a first Hoeffding Tree Classifier, a first Hoeffding Tree Adaptive Classifier, and a first Extremely Fast Decision Tree Classifier, and the second set of ML classifiers comprises a second Hoeffding Tree Classifier, a second Hoeffding Tree Adaptive Classifier, and a second Extremely Fast Decision Tree Classifier. Additionally or alternatively, the method 400 may further include receiving a third labeled data stream, and training a third set of one or more ML classifiers based on the third labeled data stream, such that ensembling at least the first set of ML classifiers and the second set of ML classifiers includes ensembling the first set of ML classifiers, the second set of ML classifiers, and the third set of ML classifiers to create the ensemble of ML classifiers.

In some implementations, the method 400 also includes storing the first set of ML classifiers in an archive of ML classifiers responsive to replacing the first set of ML classifiers with the additional set of ML classifiers in the ensemble of ML classifiers. For example, the archive of ML classifiers may include or correspond to the classifier archive 130 of FIG. 1. In some such implementations, the method 400 also includes receiving one or more additional unlabeled data streams and replacing at least one set of one or more ML classifiers of the plurality of ML classifiers of the ensemble of ML classifiers with at least one set of ML classifiers stored in the archive based on an accuracy of the at least one set of ML classifiers stored in the archive exceeding the an accuracy of the at least one set of ML classifiers of the plurality of ML classifiers of the ensemble of ML classifiers. For example, the accuracy of the at least one set of ML classifiers stored in the archive may include or correspond to the archive metrics 118 of FIG. 1, and the accuracy of the at least one set of ML classifiers of the plurality of ML classifiers of the ensemble may include or correspond to the ensemble metrics 116 of FIG. 1.

As described above, the method 400 supports dynamically updating an ensemble of ML classifiers that provides benefits compared to conventional ML classifiers. For example, by ensembling multiple sets of ML classifiers that are trained on different data streams, the method 400 may result in more accurate predictions over a longer time window than ML classifier(s) trained using an entirety of the original training data. Additionally, because the method 400 dynamically updates the ensemble to replace older sets of ML classifiers with ML classifiers trained on newer data streams (e.g., portions of data), the ensemble is able to learn changes in statistical distributions of incoming data over time. This dynamic updating of the ensemble may reduce, or eliminate, performance degradation due to concept drift, particular in the context of streaming data that can include a large volume of data in which statistical distributions (or other relevant properties) incrementally change over time. Additionally or alternatively, at least some implementations of the method 400 retain knowledge learned by the ensemble longer than other ML classifiers, such as by storing ML classifiers that are removed from the ensemble in a classifier archive. If ML classifiers stored in the classifier archive perform better than ML classifiers presently included in the ensemble, the method 400 may reintroduce one or more of the stored ML classifiers into the ensemble. If statistical distribution or patterns in received data return to previous distributions/patterns, the one or more archived ML classifiers may be reintroduced into the ensemble in order to account for this change, without waiting for the incoming data to be labeled and new ML classifiers to be trained. In this manner, the method 400 retains previously learned knowledge for re-introduction into the ensemble when useful, which may reduce, or eliminate, performance degradation due to catastrophic forgetting.

It is noted that other types of devices and functionality may be provided according to aspects of the present disclosure and discussion of specific devices and functionality herein have been provided for purposes of illustration, rather than by way of limitation. It is noted that the operations of the method 400 of FIG. 4 may be performed in any order, or that operations of one method may be performed during performance of another method, such as the method 400 of FIG. 4 including one or more operations of the example 300 of FIG. 3. It is also noted that the method 400 of FIG. 4 may also include other functionality or operations consistent with the description of the operations of the system 100 of FIG. 1 or the system 200 of FIG. 2.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-4) include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may also be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A method for dynamically updating an ensemble of machine learning classifiers, the method comprising:

receiving, by one or more processors, a first unlabeled data stream;

providing, by the one or more processors, the first unlabeled data stream as input data to the ensemble of machine learning (ML) classifiers to generate a first prediction, wherein the ensemble of ML classifiers comprises a plurality of ML classifiers configured to generate predictions based on input data streams, and wherein each set of ML classifiers of the plurality of ML classifiers of the ensemble of ML classifiers includes multiple different types of ML classifiers;

receiving, by the one or more processors, labels for the first unlabeled data stream;

training, by the one or more processors, an additional set of one or more ML classifiers based on the labels for the first unlabeled data stream and the first unlabeled data stream;

updating the ensemble of ML classifiers by replacing, by the one or more processors, a first set of one or more ML classifiers of the plurality of ML classifiers of the ensemble of ML classifiers with the additional set of ML classifiers, wherein the additional set of ML classifiers replaces an oldest set of ML classifiers of the plurality of ML classifiers of the ensemble of ML classifiers;

receiving, by the one or more processors, an additional unlabeled data stream; and providing, by the one or more processors, the additional unlabeled data stream as input data to the ensemble of ML classifiers to generate an additional prediction.

2. The method of claim 1, further comprising, prior to receiving the labels for the first unlabeled data stream:

receiving, by the one or more processors, a second unlabeled data stream; and providing, by the one or more processors, the second unlabeled data stream as input data to the ensemble of ML classifiers to generate a second prediction.

3. The method of claim 2, further comprising, after generating the additional prediction:

receiving, by the one or more processors, labels for the second unlabeled data stream;

training, by the one or more processors, a second additional set of one or more ML classifiers based on the labels for the second unlabeled data stream and the second unlabeled data stream; and replacing, by the one or more processors, a second set of one or more ML classifiers of the plurality of ML classifiers of the ensemble of ML classifiers with the second additional set of ML classifiers.

4. The method of claim 3, further comprising:

receiving, by the one or more processors and after replacing the second set of ML classifiers with the second additional set of ML classifiers, a second additional unlabeled data stream; and providing, by the one or more processors, the second additional unlabeled data stream input data to the ensemble of ML classifiers to generate a second additional prediction.

5. The method of claim 1, wherein the multiple different types of ML classifiers comprise Hoeffding Tree Classifiers, Hoeffding Tree Adaptive Classifiers, and Extremely Fast Decision Tree Classifiers, or a combination thereof.

6. The method of claim 1, further comprising, prior to receiving the first unlabeled data stream:

receiving, by the one or more processors, at least a first labeled data stream and a second labeled data stream;

training, by the one or more processors, the first set of ML classifiers based on the first labeled data stream;

training, by the one or more processors, a second set of one or more ML classifiers based on the second labeled data stream; and ensembling, by the one or more processors, at least the first set of ML classifiers and the second set of ML classifiers to create the ensemble of ML classifiers.

7. The method of claim 6, wherein:

the first set of ML classifiers comprises a first Hoeffding Tree Classifier (HTC), a first Hoeffding Tree Adaptive Classifier (HTAC), and a first Extremely Fast Decision Tree Classifier (EFDTC); and the second set of ML classifiers comprises a second HTC, a second HTAC, and a second EFDTC.

8. The method of claim 6, further comprising:

receiving, by the one or more processors, a third labeled data stream; and training, by the one or more processors, a third set of one or more ML classifiers based on the third labeled data stream, wherein ensembling at least the first set of ML classifiers and the second set of ML classifiers comprises ensembling the first set of ML classifiers, the second set of ML classifiers, and the third set of ML classifiers to create the ensemble of ML classifiers.

9. The method of claim 1, further comprising:

storing, by the one or more processors, the first set of ML classifiers in an archive of ML classifiers responsive to replacing the first set of ML classifiers with the additional set of ML classifiers in the ensemble of ML classifiers.

10. The method of claim 9, further comprising:

receiving, by the one or more processors, one or more additional unlabeled data streams; and replacing, by the one or more processors, at least one set of one or more ML classifiers of the plurality of ML classifiers of the ensemble of ML classifiers with at least one set of ML classifiers stored in the archive based on an accuracy of the at least one set of ML classifiers stored in the archive exceeding the an accuracy of the at least one set of ML classifiers of the plurality of ML classifiers of the ensemble of ML classifiers.

11. A system for dynamically updating an ensemble of machine learning classifiers, the system comprising:

a memory; and one or more processors communicatively coupled to the memory, the one or more processors configured to:

receive a first unlabeled data stream;

provide the first unlabeled data stream as input data to the ensemble of machine learning (ML) classifiers to generate a first prediction, wherein the ensemble of ML classifiers comprises a plurality of ML classifiers configured to generate predictions based on input data streams, and wherein each set of ML classifiers of the plurality of ML classifiers of the ensemble of ML classifiers includes multiple different types of ML classifiers;

receive labels for the first unlabeled data stream;

train an additional set of one or more ML classifiers based on the labels for the first unlabeled data stream and the first unlabeled data stream;

update the ensemble of ML classifiers by replacing a first set of one or more ML classifiers of the plurality of ML classifiers of the ensemble of ML classifiers with the additional set of ML classifiers, wherein the additional set of ML classifiers replaces an oldest set of ML classifiers of the plurality of ML classifiers of the ensemble of ML classifiers;

receive an additional unlabeled data stream; and provide the additional unlabeled data stream as input data to the ensemble of ML classifiers to generate an additional prediction.

12. The system of claim 11, wherein the one or more processors are further configured to receive one or more unlabeled data streams during a time period that the labels for the first unlabeled data stream are generated.

13. The system of claim 11, wherein the one or more processors are further configured to:

receive a second unlabeled data stream prior to receipt of the labels for the first unlabeled data stream;

receive labels for the second unlabeled data stream;

train a second additional set of one or more ML classifiers based on the labels for the second unlabeled data stream and the second unlabeled data stream; and replace a second set of one or more ML classifiers of the plurality of ML classifiers of the ensemble of ML classifiers with the second additional set of ML classifiers.

14. The system of claim 13, wherein the one or more processors are further configured to:

receive, after replacing the second set of ML classifiers with the second additional set of ML classifiers, a second additional unlabeled data stream; and provide the second additional unlabeled data stream as input data to the ensemble of ML classifiers to generate a second additional prediction.

15. The system of claim 11, further comprising:

a database configured to store received data streams, labels, training data, predictions, an archive of ML classifiers, or a combination thereof.

16. The system of claim 11, further comprising:

an interface configured to communicatively couple the one or more processors to one or more networks, wherein the first unlabeled data stream and the additional unlabeled data stream are received via the one or more networks from a streaming data source.

17. A non-transitory computer-readable storage medium storing instructions that, when executed by one or more processors, cause the one or more processors to perform operations for dynamically updating an ensemble of machine learning classifiers, the operations comprising:

receiving a first unlabeled data stream;

providing the first unlabeled data stream as input data to the ensemble of machine learning (ML) classifiers to generate a first prediction, wherein the ensemble of ML classifiers comprises a plurality of ML classifiers configured to generate predictions based on input data streams, and wherein each set of ML classifiers of the plurality of ML classifiers of the ensemble of ML classifiers includes multiple different types of ML classifiers;

receiving labels for the first unlabeled data stream;

training an additional set of one or more ML classifiers based on the labels for the first unlabeled data stream and the first unlabeled data stream;

updating the ensemble of ML classifiers by replacing a first set of one or more ML classifiers of the plurality of ML classifiers of the ensemble of ML classifiers with the additional set of ML classifiers, wherein the additional set of ML classifiers replaces an oldest set of ML classifiers of the plurality of ML classifiers of the ensemble of ML classifiers;

receiving an additional unlabeled data stream; and providing the additional unlabeled data stream as input data to the ensemble of ML classifiers to generate an additional prediction.

18. The non-transitory computer-readable storage medium of claim 17, wherein the plurality of ML classifiers comprises a first set of ML classifiers trained based on a first labeled data stream, a second set of ML classifiers trained based on a second labeled data stream, and a third set of ML classifiers trained based on a third labeled data stream.

19. The non-transitory computer-readable storage medium of claim 17, wherein the operations further comprise storing the first set of ML classifiers in an archive of ML classifiers responsive to replacing the first set of ML classifiers with the additional set of ML classifiers in the ensemble of ML classifiers.

* * * * *